(12) United States Patent
Hong et al.

(10) Patent No.: US 9,323,329 B2
(45) Date of Patent: Apr. 26, 2016

(54) HAPTIC PANEL AND DISPLAY APPARATUS HAVING THE SAME

(71) Applicant: Samsung Display Co., Ltd., Yongin (KR)

(72) Inventors: Won-ki Hong, Suwon-si (KR); Seung-Ho Nam, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 192 days.

(21) Appl. No.: 14/034,085

(22) Filed: Sep. 23, 2013

(65) Prior Publication Data

US 2014/0333573 A1    Nov. 13, 2014

(30) Foreign Application Priority Data

May 7, 2013   (KR) .................. 10-2013-0051306

(51) Int. Cl.
 *G06F 3/041* (2006.01)
 *G06F 3/01* (2006.01)
(52) U.S. Cl.
 CPC ...................................... *G06F 3/016* (2013.01)
(58) Field of Classification Search
 USPC ......................................... 345/173, 176, 419
 See application file for complete search history.

(56) References Cited

U.S. PATENT DOCUMENTS

| 7,098,888 B2* | 8/2006 | Temkin et al. ................. 345/156 |
| 2010/0141407 A1 | 6/2010 | Heubel et al. |
| 2011/0109584 A1 | 5/2011 | Linjama et al. |
| 2012/0133622 A1* | 5/2012 | Brokken et al. .............. 345/204 |
| 2012/0286944 A1 | 11/2012 | Forutanpour et al. |
| 2012/0287068 A1* | 11/2012 | Colgate et al. ................ 345/173 |
| 2012/0302323 A1* | 11/2012 | Gagner et al. .................. 463/25 |
| 2012/0306790 A1 | 12/2012 | Kyung et al. |
| 2013/0016042 A1* | 1/2013 | Makinen et al. .............. 345/168 |

FOREIGN PATENT DOCUMENTS

| KR | 10-2009-0121688 | 11/2009 |
| KR | 10-2010-0051386 | 5/2010 |
| KR | 10-2010-0096345 | 9/2010 |
| KR | 1032306 | 4/2011 |

* cited by examiner

*Primary Examiner* — Calvin C Ma
(74) *Attorney, Agent, or Firm* — H.C. Park & Associates, PLC

(57) ABSTRACT

Provided is a haptic panel including a plurality of haptic units. A haptic unit includes a lower electrode, a P-type semiconductor and an N-type semiconductor which are disposed on the lower electrode, a first upper electrode disposed on the P-type semiconductor, and a second upper electrode disposed on the N-type semiconductor. The haptic unit is configured to represent a tactile sense in response to a tactile signal and a thermal sense in response to a thermal signal.

20 Claims, 15 Drawing Sheets

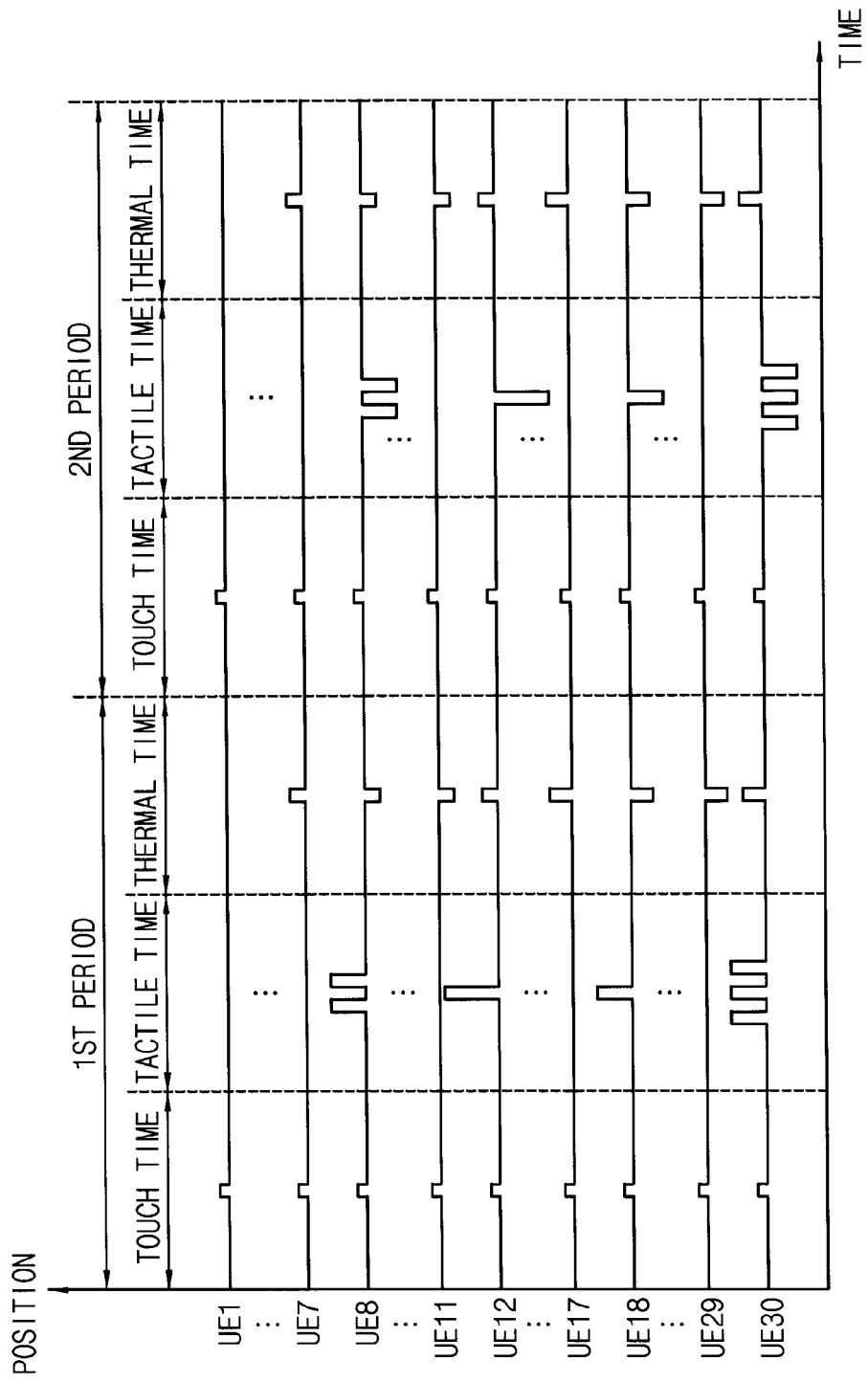

HAPTIC PANEL AND DISPLAY APPARATUS HAVING THE SAME

CROSS-REFERENCE TO RELATED APPLICATIONS

This application claims priority, under 35 U.S.C. §119, from and the benefit of Korean Patent Application No. 10-2013-0051306, filed on May 7, 2013, which is hereby incorporated by reference for all purposes as if fully set forth herein.

BACKGROUND OF THE INVENTION

1. Field

Exemplary embodiments of the present invention relate to a haptic panel and a display apparatus having the haptic panel. More particularly, exemplary embodiments of the present invention relate to a haptic panel representing tactile information and thermal information, and a display apparatus having the haptic panel.

2. Discussion of the Background

A conventional display apparatus mainly provides an image and a sound which are related to visual and auditory senses. Meanwhile, haptic displays capable of representing tactile and thermal senses matching the image displayed thereon have been in increasing demand.

A conventional haptic display apparatus generally includes an additional haptic device which is provided independently from the display panel, and thus the compatibility between the display panel and the haptic device was not satisfactory.

In addition, because the haptic device was controlled independently from the display panel, the operation of the haptic device was not sufficiently associated with the operation of the display panel.

Furthermore, there is a need for a haptic device capable of realizing/creating/representing multiple senses, for instance, tactile and thermal senses on a single haptic device so that various senses can be provided to a user.

SUMMARY OF THE INVENTION

Exemplary embodiments of the present invention provide a haptic panel capable of representing tactile and thermal senses.

Exemplary embodiments of the present invention also provide a display apparatus having the haptic panel.

In one exemplary embodiment of a haptic panel according to the present invention, the haptic panel includes a plurality of haptic units. The haptic unit represents a tactile sense in response to a tactile signal and a thermal sense in response to a thermal signal. The haptic unit includes a lower electrode, a P-type semiconductor and an N-type semiconductor which are disposed on the lower electrode, a first upper electrode disposed on the P-type semiconductor, and a second upper electrode disposed on the N-type semiconductor.

In one exemplary embodiment of a display apparatus according to the present invention, the display apparatus includes a display panel for displaying an image and a haptic panel overlapped with the display panel and including a plurality of haptic units. The haptic unit represents a tactile sense in response to a tactile signal and a thermal sense in response to a thermal signal. The haptic unit includes a lower electrode, a P-type semiconductor and an N-type semiconductor which are disposed on the lower electrode, a first upper electrode disposed on the P-type semiconductor, and a second upper electrode disposed on the N-type semiconductor.

According to the aforementioned haptic panel and the display apparatus having the haptic panel, the touch determination, the tactile representation, and the thermal representation may be implemented on the single haptic panel, and thus the haptic function may be provided more efficiently. In addition, the haptic panel implements the haptic function by an electrical method so that the compatibility and association between the haptic panel and the display panel can be improved.

It is to be understood that both the foregoing general description and the following detailed description are exemplary and explanatory and are intended to provide further explanation of the invention as claimed.

BRIEF DESCRIPTION OF THE DRAWINGS

The above and other features and advantages of the present invention will become more apparent by describing in detailed exemplary embodiments thereof with reference to the accompanying drawings.

FIG. 7 is a timing diagram illustrating a voltage applied to an upper electrode to represent tactile and thermal senses using the haptic panel of FIG. 6.

DETAILED DESCRIPTION OF THE ILLUSTRATED EMBODIMENTS

Figure 1:
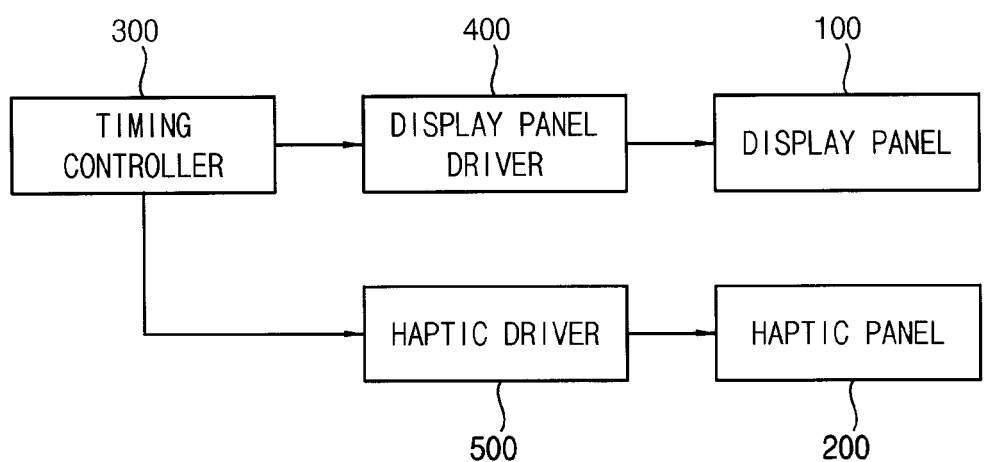
FIG. 1 is a block diagram illustrating a display apparatus according to an exemplary embodiment of the present invention.

Hereinafter, exemplary embodiments of the present invention will be explained in detail with reference to the accompanying drawings. The accompanying drawings, which are included to provide a further understanding of the invention and are incorporated in and constitute a part of this specification, illustrate embodiments of the invention, and together with the description serve to explain the principles of the invention.

In the drawings, the thickness of layers, films, panels, regions, etc. may be exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 2:
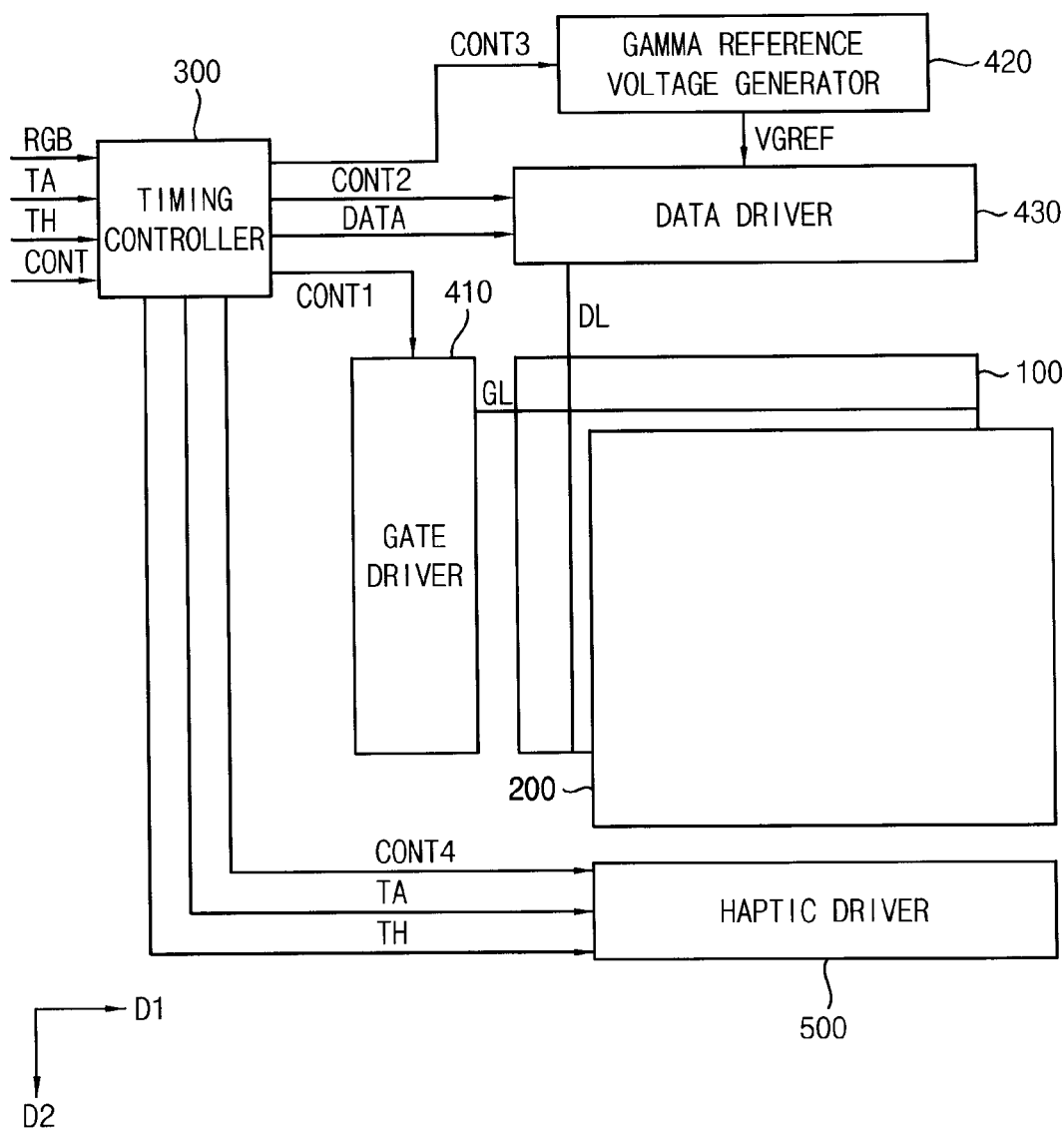
FIG. 2 is a detailed block diagram illustrating the display apparatus of FIG. 1.

FIG. 1 is a block diagram illustrating a display apparatus according to an exemplary embodiment of the present invention. FIG. 2 is a detailed block diagram illustrating the display apparatus of FIG. 1.

Referring to FIGS. 1 and 2, in accordance with one exemplary embodiment, the display apparatus may include a display panel 100, a haptic panel 200, a timing controller 300, a display panel driver 400, and a haptic driver 500. The display panel driver 400 includes a gate driver 410, a gamma reference voltage generator 420, and a data driver 430.

The display panel 100 displays an image. The display panel 100 has a display region on which an image is displayed and a peripheral region adjacent to the display region.

In accordance with one exemplary embodiment, the display panel 100 includes a plurality of gate lines GL, a plurality of data lines DL, and a plurality of unit pixels electrically connected to the gate lines GL and the data lines DL. The gate lines GL extend in a first direction D1, and the data lines DL extend in a second direction D2 crossing the first direction D1.

In accordance with one exemplary embodiment, each unit pixel includes a switching element (not shown), a liquid crystal capacitor (not shown) and a storage capacitor (not shown). The liquid crystal capacitor and the storage capacitor are electrically connected to the switching element. The unit pixels may be disposed in a matrix form.

In accordance with one exemplary embodiment, the haptic panel 200 may be a type of panel that enables the user to experience tactile senses. For instance, the haptic panel 200 may create/realize/represent a tactile sense in response to a tactile signal and a thermal sense in response to a thermal signal. The haptic panel 200 includes a plurality of haptic units for representing the tactile sense and the thermal sense.

The haptic panel 200 may be a touch panel for sensing a touch. For example, the haptic unit may be configured so that its portion in which a touch is sensed may create a tactile sense and/or a thermal sense on that portion.

An exemplary structure and operation of the haptic panel 200 is explained referring to FIGS. 3 to 10B in detail.

The timing controller 300 receives input image data RGB and an input control signal CONT from an external apparatus (not shown). The input image data RGB may include red image data R, green image data G, and blue image data B. The input control signal CONT may include a master clock signal and a data enable signal. The input control signal CONT may further include a vertical synchronizing signal and a horizontal synchronizing signal.

The timing controller 300 further receives a tactile signal TA and a thermal signal TH corresponding to the input image data RGB from an external apparatus. For example, when the input image data RGB represents the image of ice, the tactile signal TA may represent a slippery sense corresponding to the image of ice, while the thermal signal TH may represent a cold sense corresponding to the image of ice.

The timing controller 300 generates a first control signal CONT1, a second control signal CONT2, a third control signal CONT3, a fourth control signal CONT4, and a data signal DATA based on the input image data RGB and the input control signal CONT.

The timing controller 300 generates the first control signal CONT1 for controlling the operation of the gate driver 410 based on the input control signal CONT and outputs the first control signal CONT1 to the gate driver 410. The first control signal CONT1 may include a vertical start signal and a gate clock signal.

The timing controller 300 generates the second control signal CONT2 for controlling the operation of the data driver 430 based on the input control signal CONT and outputs the second control signal CONT2 to the data driver 430. The second control signal CONT2 may include a horizontal start signal and a load signal.

The timing controller 300 generates the data signal DATA based on the input image data RGB. The timing controller 300 outputs the data signal DATA to the data driver 430.

The timing controller 300 generates the third control signal CONT3 for controlling the operation of the gamma reference voltage generator 420 based on the input control signal CONT and outputs the third control signal CONT3 to the gamma reference voltage generator 420.

The timing controller 300 generates the fourth control signal CONT4 for controlling the operation of the haptic driver 500 based on the input control signal CONT and outputs the fourth control signal CONT4 to the haptic driver 500.

The timing controller 300 transmits the tactile signal TA and the thermal signal TH to the haptic driver 500.

The gate driver 410 generates gate signals for driving the gate lines GL in response to the first control signal CONT1 received from the timing controller 300. The gate driver 410 sequentially outputs the gate signals to the gate lines GL.

The gate driver 410 may be directly mounted on the display panel 100, or may be connected to the display panel 100 as a tape carrier package ("TCP") type. Alternatively, the gate driver 410 may be integrated on the peripheral region of the display panel 100.

The gamma reference voltage generator 420 generates a gamma reference voltage VGREF in response to the third control signal CONT3 received from the timing controller 300. The gamma reference voltage generator 420 provides the gamma reference voltage VGREF to the data driver 430. The gamma reference voltage VGREF has a value corresponding to a level of the data signal DATA.

In one exemplary embodiment, the gamma reference voltage generator 420 may be disposed in the timing controller 300 or in the data driver 430.

The data driver 430 receives the second control signal CONT2 and the data signal DATA from the timing controller 300, and receives the gamma reference voltages VGREF from the gamma reference voltage generator 420. The data driver 430 converts the data signal DATA into data voltages having an analog type using the gamma reference voltages VGREF. The data driver 430 outputs the data voltages to the data lines DL.

The data driver 430 may be directly mounted on the display panel 100, or be connected to the display panel 100 in a TCP type. Alternatively, the data driver 430 may be integrated on the peripheral region of the display panel 100.

The haptic driver 500 is connected to the haptic panel 200 to drive the haptic panel 200.

The haptic driver 500 receives the fourth control signal CONT4, the tactile signal TA, and the thermal signal TH from the timing controller 300. The haptic driver 500 generates a touch voltage, a tactile voltage, and a thermal voltage based on the fourth control signal CONT4, the tactile signal TA and the thermal signal TH. The haptic driver 500 outputs the touch voltage, the tactile voltage, and the thermal voltage to the haptic panel 200.

Figure 5:
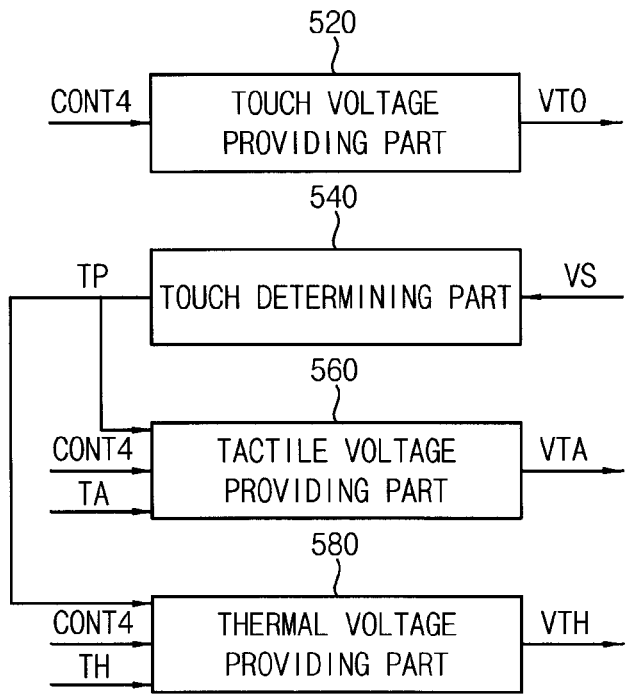
FIG. 5 is a block diagram illustrating a haptic driver of FIG. 2.

An exemplary structure of the haptic driver 500 is explained referring to FIG. 5 in detail.

Figure 3:
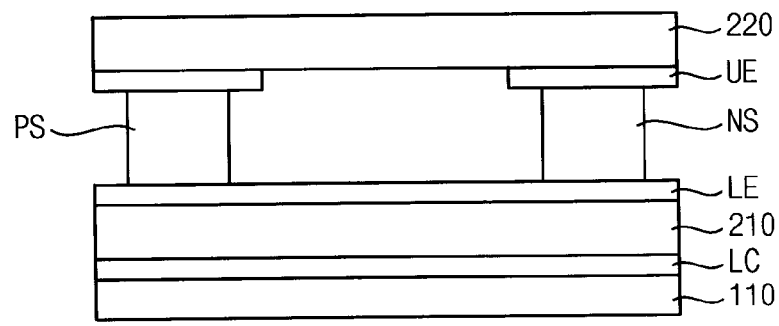
FIG. 3 is a cross-sectional view illustrating the display apparatus of FIG. 1.

FIG. 3 is a cross-sectional view illustrating the display apparatus of FIG. 1.

Referring to FIGS. 1 to 3, the display apparatus includes the display panel 100 and the haptic panel 200. In one exemplary embodiment, the haptic panel 200 has an on-cell structure.

The display panel 100 is defined by a first substrate 110, a second substrate 210 facing the first substrate 110, and a liquid crystal layer LC disposed between the first and second substrates 110 and 210.

The haptic panel 200 is defined by the second substrate 210, a third substrate 220, a lower electrode LE, a P-type semiconductor PS, an N-type semiconductor NS, and an upper electrode UE. The lower electrode LE, the P-type semiconductor PS, the N-type semiconductor NS, and the upper electrode UE are disposed between the second and third substrates 210 and 220.

The liquid crystal layer LC is disposed on the first substrate 110. The second substrate 210 is disposed on the liquid crystal layer LC. For example, a thin film transistor array may be disposed between the first substrate 110 and the liquid crystal layer LC. A color filter layer may be disposed between the liquid crystal layer LC and the second substrate 210.

The lower electrode LE is disposed on the second substrate 210. The P-type semiconductor and the N-type semiconductor are disposed on the lower electrode LE. The upper electrode UE is disposed on the P-type semiconductor PS and the N-type semiconductor NS.

The P-type semiconductor may include at least one of Bismuth Telluride (Bi2Te3), Antimony Telluride (Bi2Sb3), Lead Telluride (Bi2Se3), Indium Selenide (In4Se3-x), Polyvinylidene fluoride (PVDF), PZT, carbon nanotube, graphene, and a metal wire. The N-type semiconductor may include at least one of Bismuth Telluride (Bi2Te3), Antimony Telluride (Bi2Sb3), Lead Telluride (Bi2Se3), Indium Selenide (In4Se3-x), Polyvinylidene fluoride (PVDF), PZT, carbon nanotube, graphene, and a metal wire. The P-type semiconductor and the N-type semiconductor may include a transparent material.

FIG. 3 corresponds to a single haptic unit. The haptic unit includes the lower electrode LE disposed on the second substrate 210, the P-type semiconductor PS and the N-type semiconductor NS, a first upper electrode disposed on the P-type semiconductor PS and a second upper electrode disposed on the N-type semiconductor NS.

Figure 4A:
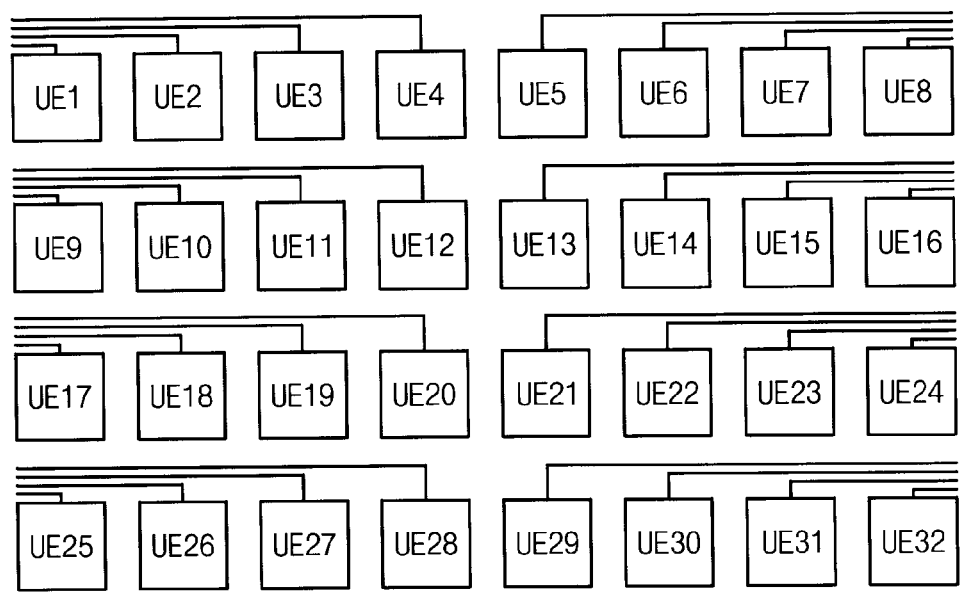
FIG. 4A is a plain view illustrating an upper electrode layer of a haptic panel of FIG. 2.
Figure 4B:
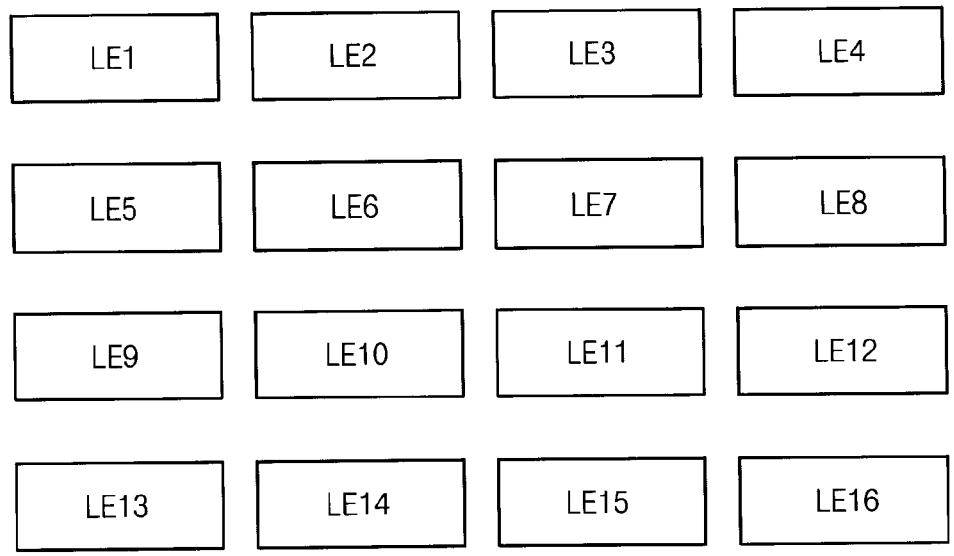
FIG. 4B is a plain view illustrating a lower electrode layer of the haptic panel of FIG. 2.
Figure 4C:
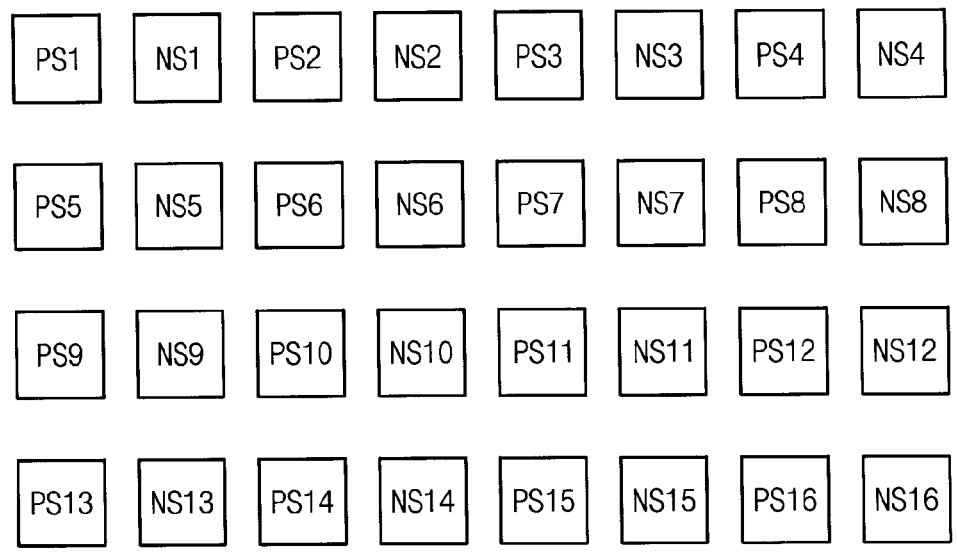
FIG. 4C is a plain view illustrating a semiconductor layer of the haptic panel of FIG. 2.

FIG. 4A is a plain view illustrating an upper electrode layer of the haptic panel 200 of FIG. 2. FIG. 4B is a plain view illustrating a lower electrode layer of the haptic panel 200 of FIG. 2. FIG. 4C is a plain view illustrating a semiconductor layer of the haptic panel 200 of FIG. 2.

Referring to FIGS. 1 to 4C, the upper electrode layer of the haptic panel 200 includes a plurality of the upper electrodes UE. Although the upper electrode layer is depicted to include 32 upper electrodes UE in FIG. 4A in accordance with one exemplary embodiment, the upper electrode layer in FIG. 4A does not correspond to the entire haptic panel 200 but corresponds to a portion of the haptic panel 200. Meanwhile, the lower electrode layer of the haptic panel 200 includes a plurality of the lower electrodes LE. Although the lower electrode layer is depicted to include 16 lower electrodes LE in FIG. 4B in accordance with one exemplary embodiment, the lower electrode layer in FIG. 4B does not correspond to the entire haptic panel 200 but corresponds to a portion of the haptic panel 200. The semiconductor layer of the haptic panel 200 includes a plurality of the P-type semiconductors PS and a plurality of the N-type semiconductors NS. Although the semiconductor layer is shown to include 16 P-type semiconductors PS and 16 N-type semiconductors NS in FIG. 4C, the semiconductor layer in FIG. 4C does not correspond to the entire haptic panel 200 but corresponds to a portion of the haptic panel 200.

In one exemplary embodiment, the single lower electrode LE may be overlapped with the single P-type semiconductor PS and the signal N-type semiconductor NS and two upper electrodes UE.

A first lower electrode LE1 is overlapped with a first P-type semiconductor PS1 and a first N-type semiconductor NS1. The first P-type semiconductor PS1 is overlapped with a first upper electrode UE1, while the first N-type semiconductor NS1 is overlapped with a second upper electrode UE2. The first lower electrode LE1, the first P-type semiconductor PS1, the first N-type semiconductor NS1, the first upper electrode UE1, and the second upper electrode UE2 may form a single haptic unit. In accordance with one exemplary embodiment, the wiring extending from the first upper electrode UE1 is connected to the wiring extending from the second upper electrode UE2 to form a closed circuit. A voltage is applied between the wiring extending from the first upper electrode UE1 and the wiring extending from the second upper electrode UE2. In contrast, the first lower electrode LE1 is not connected to the wiring.

Further, a second lower electrode LE2 is overlapped with a second P-type semiconductor PS2 and a second N-type semiconductor NS2. The second P-type semiconductor PS2 is overlapped with a third upper electrode UE3, while the second N-type semiconductor NS2 is overlapped with a fourth upper electrode UE4. The second lower electrode LE2, the second P-type semiconductor PS2, the second N-type semiconductor NS2, the third upper electrode UE3, and the fourth upper electrode UE4 may form another single haptic unit. The wiring extending from the third upper electrode UE3 is connected to the wiring extending from the fourth upper electrode UE4 to form a closed circuit. A voltage is applied between the wiring extending from the third upper electrode UE3 and the wiring extending from the fourth upper electrode UE4. In contrast, the second lower electrode LE2 is not connected to the wiring.

In the above-described exemplary embodiment, although the lower electrode is overlapped with two upper electrodes which are adjacent in the first direction D1, the present invention is not limited thereto. Alternatively, the lower electrode may be overlapped with two upper electrodes which are adjacent in the second direction D2. It should be noted that the drawings only show exemplary arrangements of electrodes, semiconductors, and other elements, and they may be formed/arranged/combined in any suitable manner to realize tactile and/or thermal senses in association with touch sensing.

FIG. 5 is a block diagram illustrating the haptic driver 500 of FIG. 2.

Referring to FIGS. 1 to 5, the haptic driver 500 includes a touch voltage providing part 520, a touch determining part 540, a tactile voltage providing part 560, and a thermal voltage providing part 580.

The touch voltage providing part 520 provides a touch voltage VT0 to the haptic panel 200 based on the fourth control signal CONT4. The touch determining part 540 receives a sensing voltage VS from the haptic panel 200 to determine a touch position. The touch determining part 540 outputs a touch position signal TP, which corresponds to the determined touch position, to the tactile voltage providing part 560 and the thermal voltage providing part 580.

In one exemplary embodiment, the haptic panel 200 may determine the touch position by any suitable method, for instance, a single ITO method.

For example, the haptic panel 200 may determine the touch position using a self capacitance driving method. In the self capacitance driving method, the touch voltage VT0 is applied to the upper electrodes, and the sensing voltage VS is sensed from the upper electrodes. In the self capacitance driving method, the touch position may be determined by the unit of one upper electrode. Thus, according to one embodiment, the resolution of the touch position sensing is a single upper electrode.

Further, the haptic panel 200 may determine the touch position using a dual capacitance driving method in accordance with one exemplary embodiment. In the dual capacitance driving method, the touch voltage VT0 is applied to one of two upper electrodes and the sensing voltage VS is sensed from the other one of the two upper electrodes to which the touch voltage VT0 is not applied. Halves of the upper electrodes may be touch voltage receiving electrodes and other halves of the upper electrodes may be touch voltage sensing electrodes. In the dual capacitance driving method, the touch position may be determined by the unit of two upper electrodes.

Alternatively, the haptic panel 200 may determine the touch position using a thermal sensor to sense a touch by detecting the heat from the body part of the user.

Although one lower electrode may be overlapped with two upper electrodes according to one exemplary embodiment, the present invention is not limited thereto. Alternatively, one upper electrode may be overlapped with two lower electrodes. The wiring may be connected to both of the upper electrodes and the lower electrodes so that the haptic panel may determine the touch position by a double ITO method.

The tactile voltage providing part 560 transmits a tactile voltage VTA to the haptic panel 200 based on the fourth control signal CONT4. The amplitude and frequency of the tactile voltage VTA may be adjusted to represent various tactile senses.

The tactile voltage providing part 560 may generate a tactile sense at the touch position based on the fourth control signal CONT4 and the touch position signal TP.

The thermal voltage providing part 580 transmits a thermal voltage VTH to the haptic panel 200 based on the fourth control signal CONT4. The polarity and amplitude of the thermal voltage VTH may be adjusted to represent various thermal senses.

The thermal voltage providing part 580 may generate a thermal sense at a touch position based on the fourth control signal CONT4 and the touch position signal TP.

Figure 6:
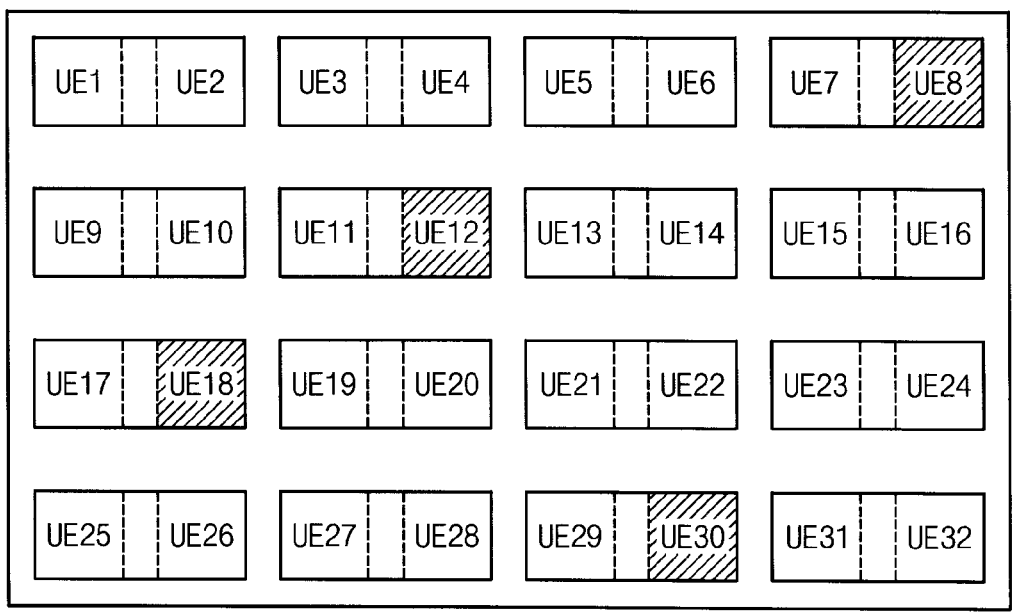
FIG. 6 is a conceptual diagram illustrating the haptic panel of FIG. 2 when a touch is generated on the haptic panel.
Figure 8A:
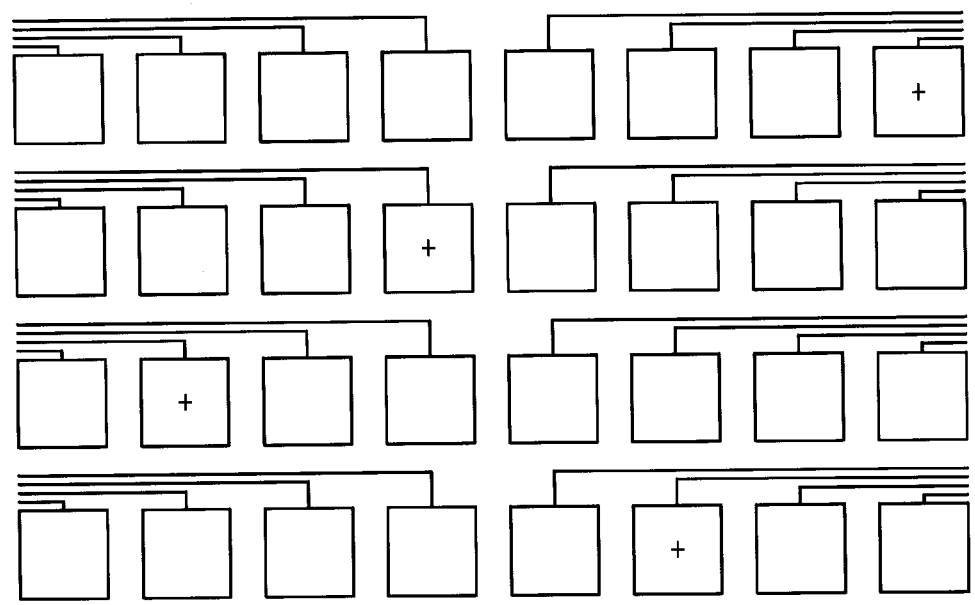
FIG. 8A is a plain view illustrating a voltage applied to the upper electrode to represent the tactile sense using the haptic panel of FIG. 6 during a first period.
Figure 8B:
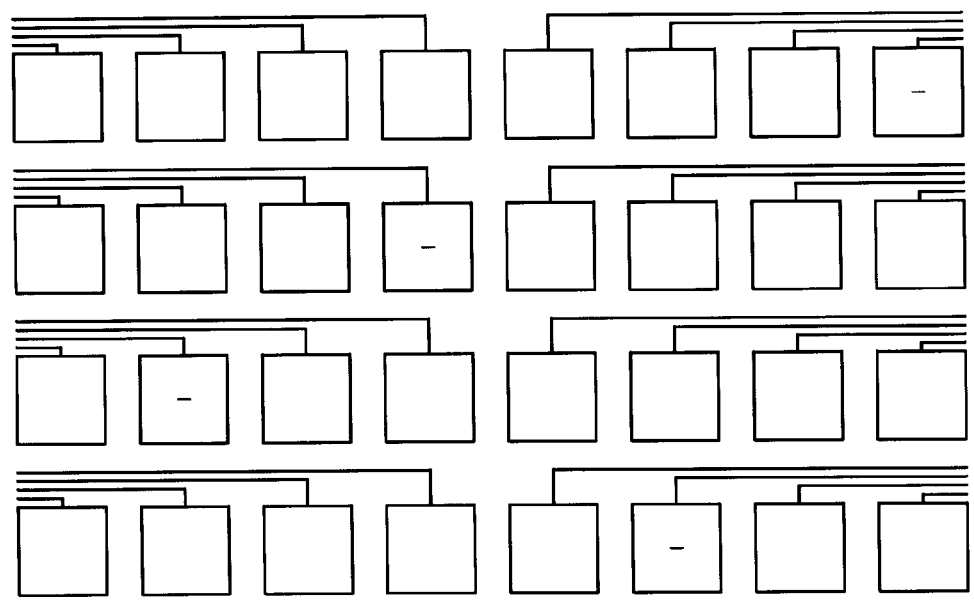
FIG. 8B is a plain view illustrating a voltage applied to the upper electrode to represent the tactile sense using the haptic panel of FIG. 6 during a second period.
Figure 9:
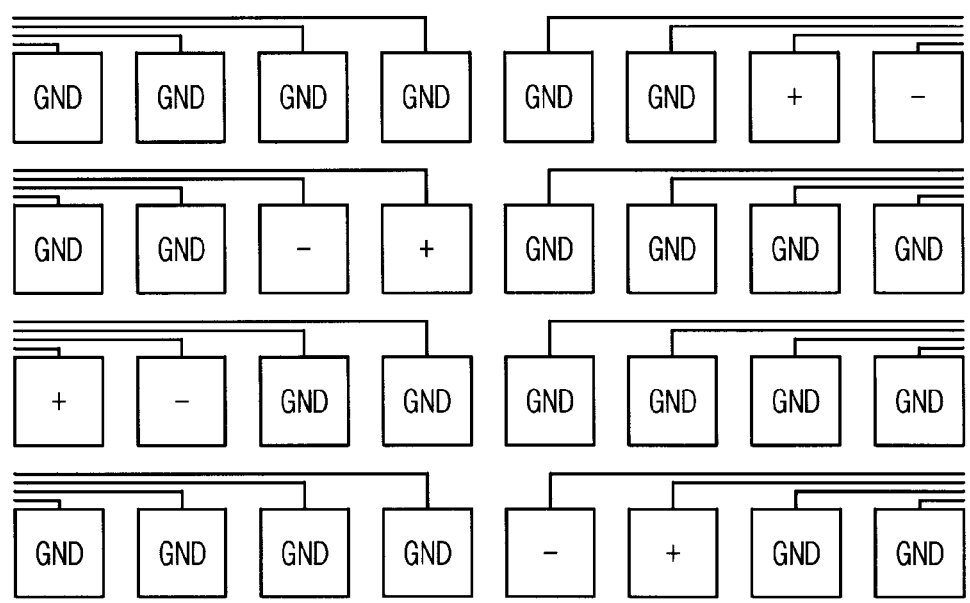
FIG. 9 is a plain view illustrating a voltage applied to the upper electrode to represent the thermal sense using the haptic panel of FIG. 6.
Figure 10A:
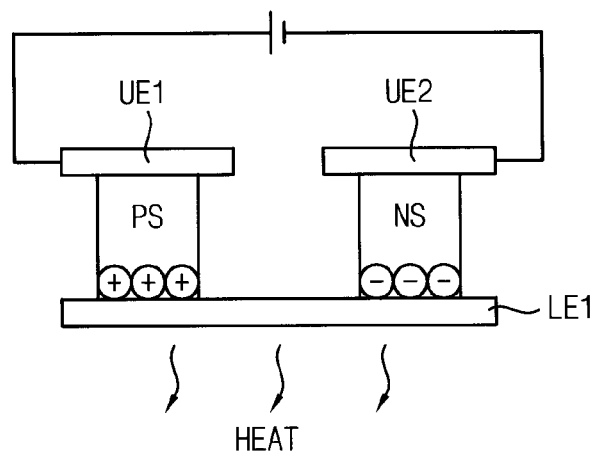
FIGS. 10A and 10B are circuit diagrams illustrating a method of representing the thermal sense using the haptic panel of FIG. 6.
Figure 10B:
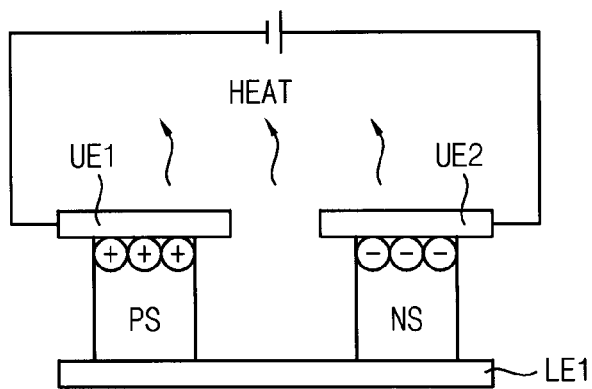

FIG. 6 is a conceptual diagram illustrating the haptic panel 200 of FIG. 2 when a touch is detected on the haptic panel 200. FIG. 7 is a timing diagram illustrating a voltage applied to the upper electrode UE to represent tactile and thermal senses using the haptic panel 200 of FIG. 6. FIG. 8A is a plain view of upper electrodes illustrating voltages applied to the upper electrodes UE to represent the tactile sense using the haptic panel 200 of FIG. 6 during a first period. FIG. 8B is a plain view of the upper electrodes illustrating voltages applied to the upper electrodes UE to represent the tactile sense using the haptic panel 200 of FIG. 6 during a second period. FIG. 9 is a plain view of the upper electrodes illustrating voltages applied to the upper electrodes UE to represent the thermal sense using the haptic panel 200 of FIG. 6. FIGS. 10A and 10B are circuit diagrams illustrating a method of representing the thermal sense using the haptic panel 200 of FIG. 6.

Referring to FIGS. 6 to 10B, an exemplary method of representing the tactile sense and the thermal sense on the haptic panel 200 is explained in detail hereinafter. In FIG. 6, touches are detected at an eighth upper electrode UE8, a twelfth upper electrode UE12, an eighteenth upper electrode UE18, and a thirtieth upper electrode UE30. In response, a slippery tactile sense and a cool thermal sense are represented on the eighth upper electrode UE8, a rough tactile sense and a warm thermal sense are represented on the twelfth upper electrode UE12, a tender tactile sense and a cold thermal sense are represented on the eighteenth upper electrode UE18, and a slippery tactile sense and a hot thermal sense are represented on the thirtieth upper electrode UE30.

In one exemplary embodiment, the haptic driver 500 may determine the touch positions by the single ITO self capacitance method. Further, the haptic unit may represent a tactile sense by the electrostatic method and a thermal sense by the Peltier method.

The haptic driver 500 provides the touch voltage VT0 to the haptic panel 200 to determine the touch position during the touch time of a first period. The haptic driver 500 provides the tactile voltage VTA to the haptic panel 200 to represent the tactile sense during the tactile time of the first period. The haptic driver 500 provides the thermal voltage VTH to the haptic panel 200 to represent the thermal sense during the thermal time of the first period.

In accordance with one embodiment, the haptic driver 500 may drive the haptic panel 200 such that only the haptic unit corresponding to the touch position represents the tactile sense and the thermal sense based on the touch position. Alternatively, the haptic panel 200 may be controlled such that the haptic unit corresponding to the touch position and certain adjacent haptic units generates the tactile sense and/or the thermal sense based on the detected touch position.

Although it is described according to one exemplary embodiment that the touch voltage VT0, the tactile voltage VTA, and the thermal voltage VTH are sequentially applied to the haptic panel 200, the sequence of the touch voltage VT0, the tactile voltage VTA, and the thermal voltage VTH may be switched appropriately.

In accordance with one embodiment, the touch voltage VT0, the tactile voltage VTA, and the thermal voltage VTH may be provided to the haptic panel 200 in a vertical blank period which is provided between the frames of the display panel 100.

Alternatively, the touch voltage VT0, the tactile voltage VTA, and the thermal voltage VTH may be provided to the haptic panel 200 regardless of the frames of the display panel 100. For example, the touch voltage VT0, the tactile voltage VTA, and the thermal voltage VTH may be provided to the haptic panel 200 in a scanning period of the gate line GL of the display panel 100.

When it comes to the electrostatic method, it is a method that generates a tactile sense by creating a frictional force and an attractive force. In addition, the amplitude and frequency of the tactile voltage VTA may be adjusted to represent various tactile senses.

For instance, a tactile voltage VTA having a high frequency is applied to the eighth upper electrode UE8 to represent the slippery tactile sense. A tactile voltage VTA having a high amplitude is applied to the twelfth upper electrode UE12 to represent the rough tactile sense. A tactile voltage VTA having a low amplitude is applied to the eighteenth upper electrode UE18 to represent the tender tactile sense. A tactile voltage VTA having a high frequency is applied to the thirtieth upper electrode UE30 to represent the slippery tactile sense.

During the tactile time of the first period, a tactile voltage VTA having a first polarity is applied to the upper electrode corresponding to the touch position. During the tactile time of a second period, a tactile voltage VTA having a second polarity is applied to the upper electrode corresponding to the touch position. The upper electrodes not corresponding to the touch position may be floated.

Thus, the resolution of representing the tactile sense may be the unit of a single upper electrode. In other words, the resolution of representing the tactile sense may be half of the haptic unit.

As for the Peltier method, it is a method of generating heat energy: an electromotive force is transformed to heat. As shown in FIG. 10A, when a positive electrode (e.g., a cathode) is connected to the P-type semiconductor PS, and a negative electrode (e.g., an anode) is connected to the N-type semiconductor NS, holes and electrons flow toward the lower electrode LE1 so that the holes and the electrons transport the heat. Thus, the temperature around the lower electrode LE1 increases, and the temperature around the upper electrodes UE1 and UE2 decreases.

As shown in FIG. 10B, when a negative electrode (e.g., an anode) is connected to the P-type semiconductor PS and a positive electrode (e.g., a cathode) is connected to the N-type semiconductor NS, holes and electrons flow toward the upper electrode UE1 and UE2 so that the holes and the electrons transport the heat. Thus, the temperature around the upper electrode UE1 and UE2 increases, and the temperature around the lower electrode LE1 decreases.

In accordance with one embodiment, in order to represent a cool thermal sense at the eighth upper electrode UE8, a negative thermal voltage VTH is applied to the eighth upper electrode UE8, and a positive thermal voltage VTH is applied to a seventh upper electrode UE7 sharing the lower electrode with the eighth upper electrode UE8. Further, in order to represent a warm thermal sense at the twelfth upper electrode UE12, a positive thermal voltage VTH is applied to the twelfth upper electrode UE12, and a negative thermal voltage VTH is applied to an eleventh upper electrode UE11 sharing the lower electrode with the twelfth upper electrode UE12. In order to represent a cold thermal sense at the eighteenth upper electrode UE18, a negative thermal voltage VTH having a relatively high amplitude is applied to the eighteenth upper electrode UE18, and a positive thermal voltage VTH having a relatively high amplitude is applied to a seventeenth upper electrode UE17 sharing the lower electrode with the eighteenth upper electrode UE18. In order to represent a hot thermal sense at the thirtieth upper electrode UE30, a positive thermal voltage VTH having a relatively high amplitude is applied to the thirtieth upper electrode UE30, and a negative thermal voltage VTH having a relatively high amplitude is applied to a twenty-ninth upper electrode UE29 sharing the lower electrode with the thirtieth upper electrode UE30.

In addition, a ground voltage GND may be applied to the upper electrodes of the haptic units not corresponding to the touch position.

Thus, the resolution of representing the thermal sense may be the unit of two upper electrodes. In other words, the resolution of representing the thermal sense may be the single haptic unit.

Although not shown in the figures, the display apparatus may further include a radiating element to effectively release the heat generated to represent the thermal sense.

According to one exemplary embodiment, the haptic panel 200 is operable to generate a tactile sense in response to a tactile signal and a thermal sense in response to a thermal signal. Advantageously, because the touch determination, the tactile representation, and/or the thermal representation can be implemented on the single haptic panel 200, the haptic function can be provided more efficiently and in a way that it is associated with the user's touch event. In addition, because the haptic panel 200 implements the haptic function using an electrical method, rather than mechanical, so that the compatibility between the haptic panel 200 and the display panel 100 can be improved.

Figure 11:
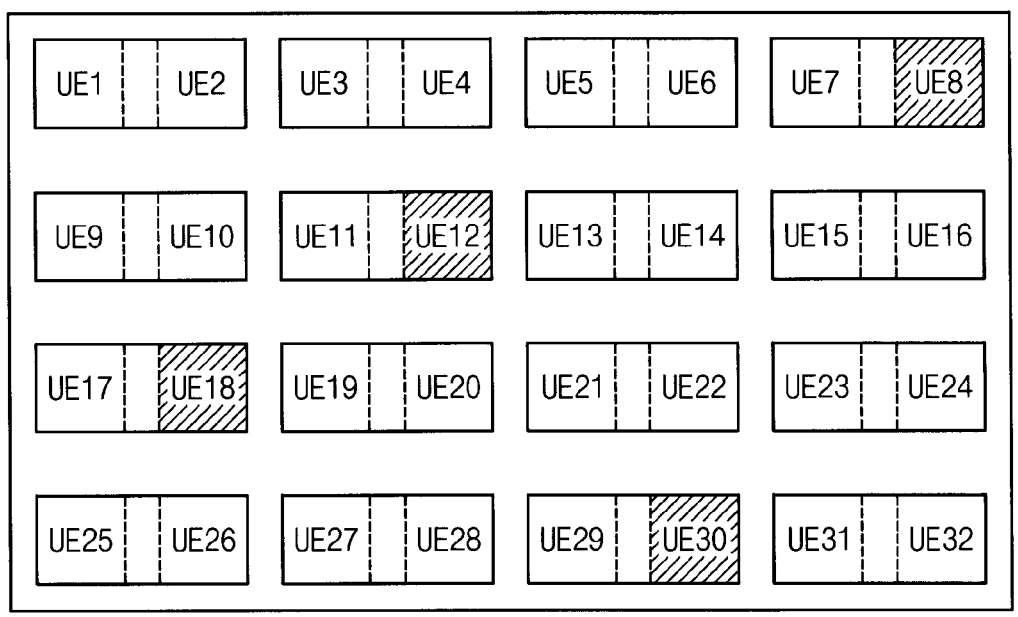
FIG. 11 is a conceptual diagram illustrating a haptic panel according to an exemplary embodiment of the present invention when a touch is generated on the haptic panel.
Figure 12:
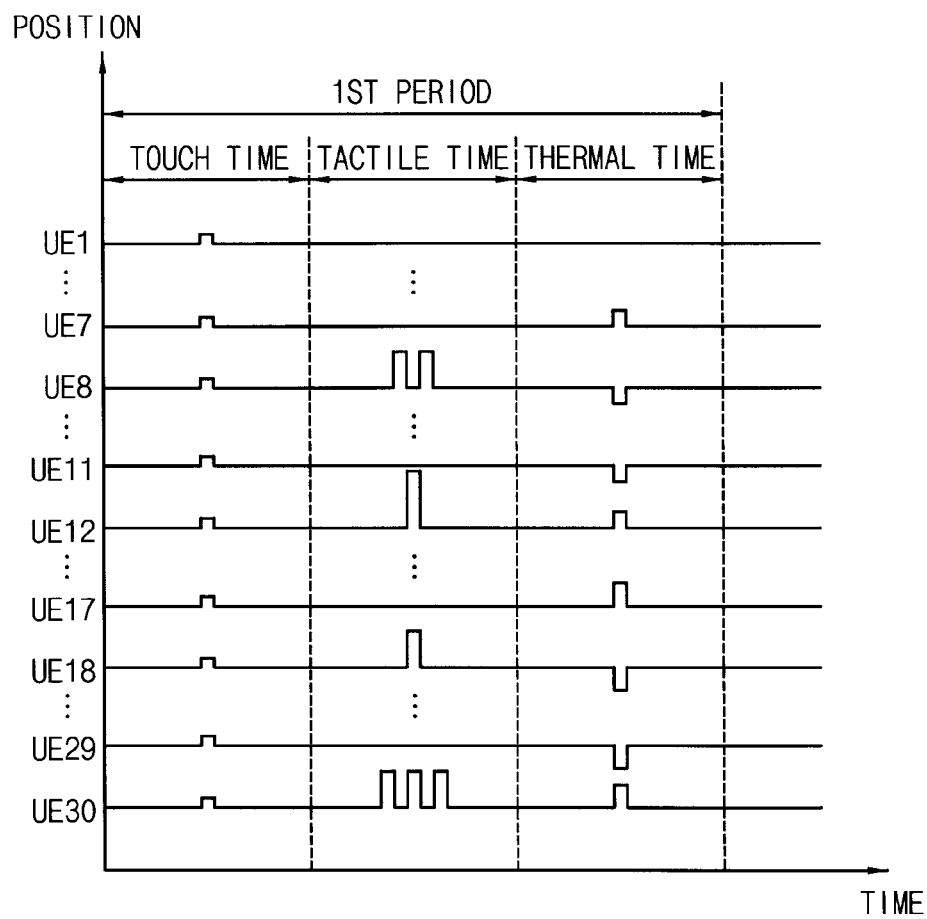
FIG. 12 is a timing diagram illustrating a voltage applied to an upper electrode to represent tactile and thermal senses using the haptic panel of FIG. 11.
Figure 13:
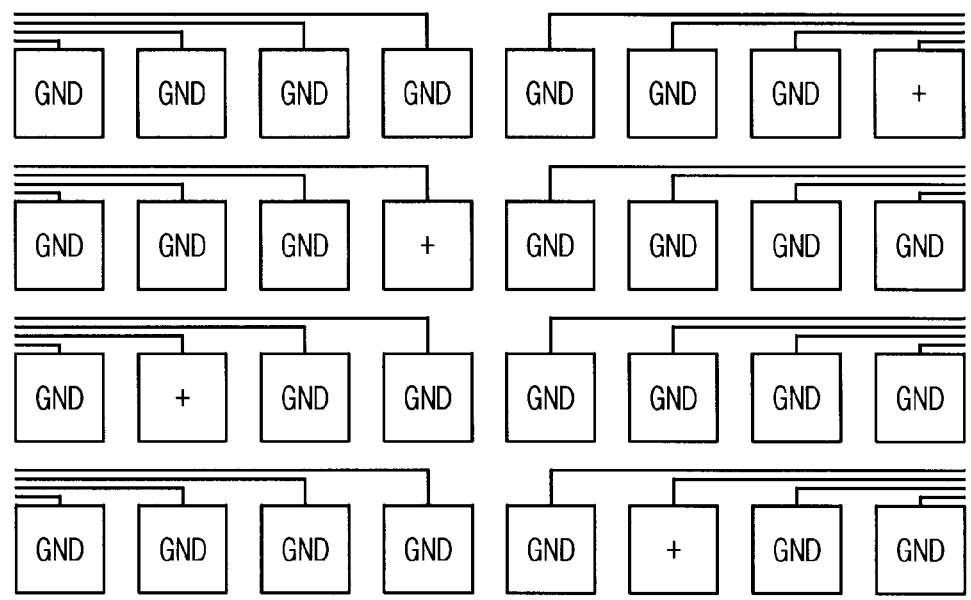
FIG. 13 is a plain view illustrating a voltage applied to the upper electrode to represent the tactile sense using the haptic panel of FIG. 11.

FIG. 11 is a conceptual diagram illustrating a haptic panel according to one exemplary embodiment of the present invention when a touch is generated on the haptic panel. FIG. 12 is a timing diagram illustrating voltages applied to upper electrodes to represent tactile and thermal senses using the haptic panel of FIG. 11. FIG. 13 is a plain view of upper electrodes illustrating voltages applied to the upper electrodes to represent the tactile sense using the haptic panel of FIG. 11.

The haptic panel and the display apparatus having the haptic panel according to one example embodiment may be substantially the same as the haptic panel and the display apparatus explained referring to FIGS. 1 to 10B except for a method of representing the tactile sense. Thus, the same reference numerals will be used to refer to the same or like parts as those described in the example embodiments of FIGS. 1 to 10B, and the same explanations concerning the above elements will not be repeated.

Referring to FIGS. 1, 2, 11 to 13, the display apparatus includes a display panel 100, a haptic panel 200, a timing controller 300, a display panel driver 400, and a haptic driver 500. The display panel driver 400 includes a gate driver 410, a gamma reference voltage generator 420, and a data driver 430.

The haptic panel 200 represents a tactile sense in response to a tactile signal and a thermal sense in response to a thermal signal. The haptic panel 200 includes a plurality of haptic units for representing the tactile sense and the thermal sense.

In accordance with one exemplary embodiment, the haptic driver 500 determines a touch position by the single ITO self capacitance method. The haptic unit may represent a tactile sense by the electrocutaneous method. The haptic unit may represent the thermal sense by the Peltier method.

The haptic driver 500 provides the touch voltage VT0 to the haptic panel 200 to determine a touch position during the touch time of a first period. The haptic driver 500 provides the tactile voltage VTA to the haptic panel 200 to represent a tactile sense during the tactile time of the first period. The haptic driver 500 provides the thermal voltage VTH to the haptic panel 200 to represent a thermal sense during the thermal time of the first period.

By the electrocutaneous method, a tactile sense is represented by an electric field which is formed between electrodes and stimulates the receptor on the user's skin. In addition, the amplitude and frequency of the tactile voltage VTA may be adjusted to represent various tactile senses.

In accordance with one exemplary embodiment, in order to represent a slippery tactile sense, a tactile voltage VTA having a first polarity and a high frequency may be applied to the eighth upper electrode UE8. Further, in order to represent a rough tactile sense, a tactile voltage VTA having a first polarity and a high amplitude may be applied to the twelfth upper electrode UE12. In order to represent a tender tactile sense, a tactile voltage VTA having a first polarity and a low amplitude may be applied to the eighteenth upper electrode UE18. In order to represent a slippery tactile sense, a tactile voltage VTA having a first polarity and a high frequency is applied to the thirtieth upper electrode UE30.

In addition, a ground voltage GND may be applied to the upper electrodes not corresponding to the touch position.

According to one exemplary embodiment, the haptic panel 200 is operable to generate a tactile sense in response to a tactile signal and a thermal sense in response to a thermal signal. Thus, the touch determination, the tactile representation, and/or the thermal representation can be implemented on the single haptic panel 200, and thus the haptic function can be provided more efficiently. In addition, the haptic panel 200 implements the haptic function using an electrical method, rather than mechanical, and thus the connectivity between the haptic panel 200 and the display panel 100 can be improved.

Figure 14A:
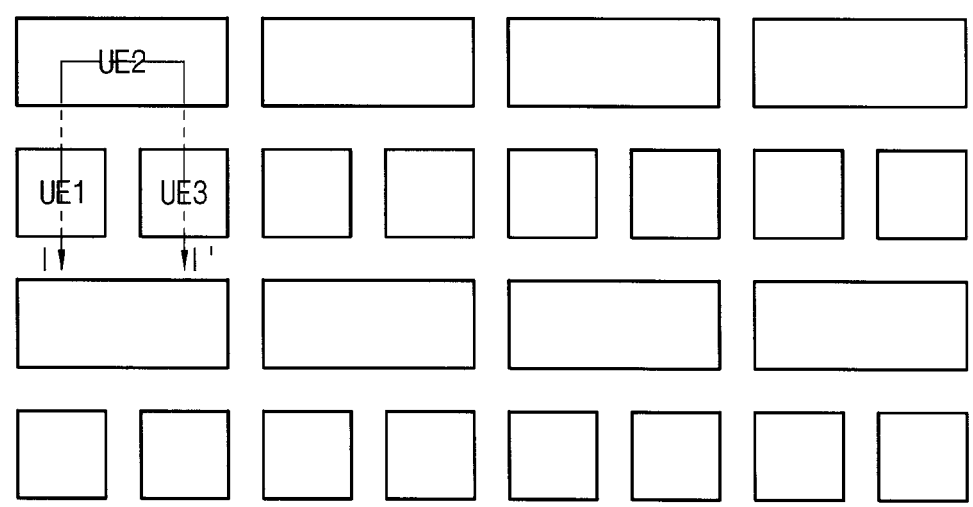
FIG. 14A is a plain view illustrating an upper electrode layer of a haptic panel according to an exemplary embodiment of the present invention.
Figure 14B:
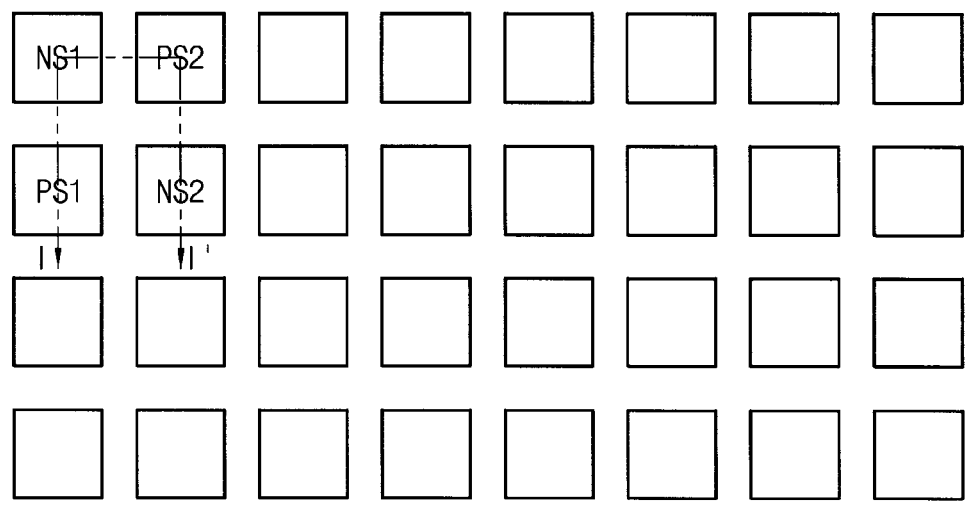
FIG. 14B is a plain view illustrating a semiconductor layer of the haptic panel of FIG. 14A.
Figure 14C:
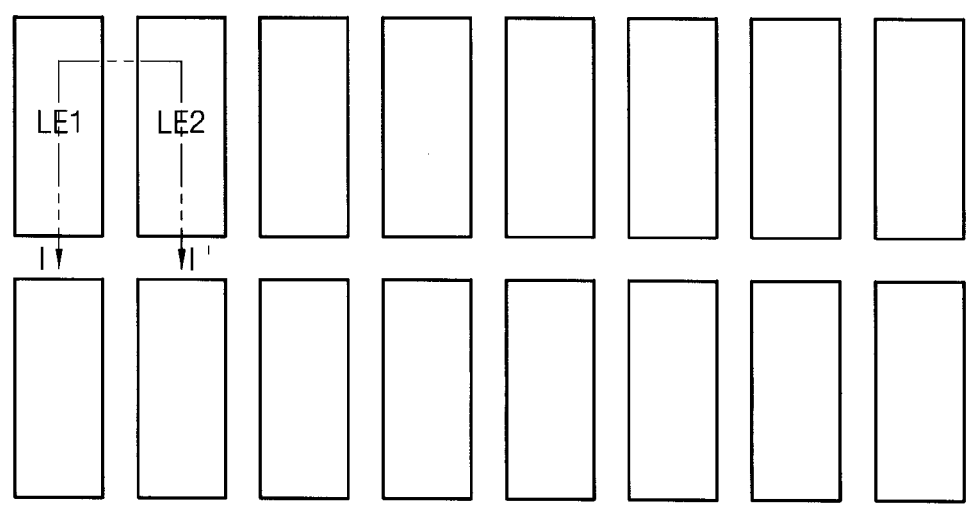
FIG. 14C is a plain view illustrating a lower electrode layer of the haptic panel of FIG. 14A.
Figure 15:
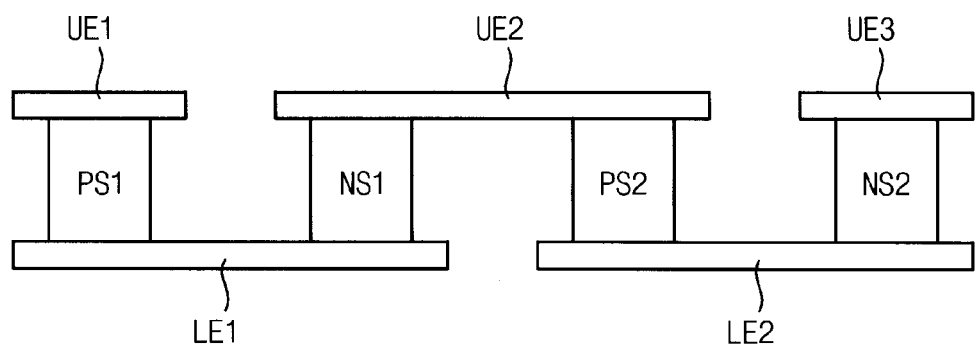
FIG. 15 is a cross-sectional view illustrating a haptic unit cut along a line I-I' of FIGS. 14A to 14C.

FIG. 14A is a plain view of an upper electrode layer of a haptic panel according to one exemplary embodiment of the present invention. FIG. 14B is a plain view of a semiconductor layer of the haptic panel of FIG. 14A. FIG. 14C is a plain view of a lower electrode layer of the haptic panel of FIG. 14A. FIG. 15 is a cross-sectional view of a haptic unit cut along a line I-I' of FIGS. 14A to 14C.

The haptic panel and the display apparatus having the haptic panel according to one exemplary embodiment are substantially the same as the haptic panel and the display apparatus explained referring to FIGS. 1 to 10B except that the upper electrode and the lower electrode form a matrix shape in the single haptic unit. Thus, the same reference numerals will be used to refer to the same or like parts as those described with reference to FIGS. 1 to 10B, and the same explanations concerning the above elements will not be repeated.

Referring to FIGS. 1, 2, 14A to 15, the display apparatus includes a display panel 100, a haptic panel 200, a timing controller 300, a display panel driver 400, and a haptic driver 500. The display panel driver 400 includes a gate driver 410, a gamma reference voltage generator 420, and a data driver 430.

The haptic panel 200 represents a tactile sense in response to a tactile signal and a thermal sense in response to a thermal signal. The haptic panel 200 includes a plurality of haptic units for representing the tactile sense and the thermal sense.

In accordance with one exemplary embodiment, the haptic unit includes two lower electrodes LE, two P-type semiconductors PS, two N-type semiconductors NS, and three upper electrodes UE.

A first lower electrode LE1 is overlapped with a first P-type semiconductor PS1 and a first N-type semiconductor NS1 adjacent to the first P-type semiconductor PS1. A first upper electrode UE1 is overlapped with the first P-type semiconductor PS1. A second upper electrode UE2 is overlapped with the first N-type semiconductor NS1 and a second P-type semiconductor PS2 adjacent to the first N-type semiconductor NS1. A second lower electrode LE2 is overlapped with the second P-type semiconductor PS2 and a second N-type semiconductor NS2 adjacent to the second P-type semiconductor PS2. A third upper electrode UE3 is overlapped with the second N-type semiconductor NS2.

The sense resolution of the touch position is a single upper electrode. The resolution of representing the tactile sense is a single upper electrode. The resolution of representing the thermal sense is a single haptic unit.

Although the haptic unit includes two by two semiconductors according to one exemplary embodiment, the present invention is not limited thereto, and any suitable pair or combination of semiconductors may be used.

According to one exemplary embodiment, the haptic panel 200 generates a tactile sense in response to a tactile signal and a thermal sense in response to a thermal signal. Thus, the touch determination, the tactile representation, and/or the thermal representation may be implemented on the single haptic panel 200 the haptic function may be provided more efficiently. In addition, the haptic panel 200 implements the haptic function by an electrical method, rather than mechanical, so that the compatibility between the haptic panel 200 and the display panel 100 can be improved.

In addition, the thermal sense is represented using multiple, for instance, four semiconductors so that the thermal sense can be represented more accurately and effectively.

Figure 16:
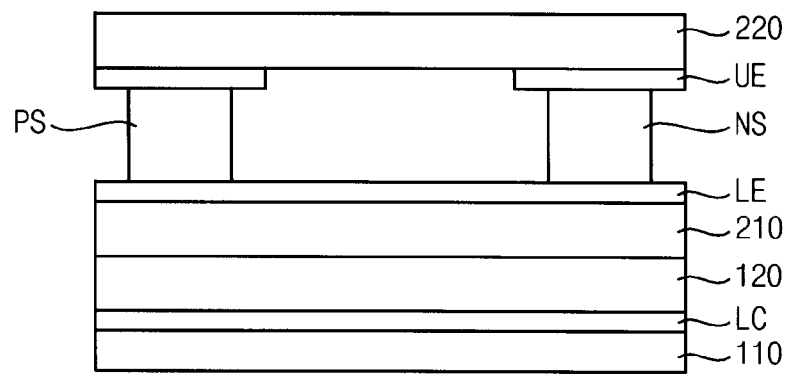
FIG. 16 is a cross-sectional view illustrating a display apparatus according to an exemplary embodiment of the present invention.

FIG. 16 is a cross-sectional view of a display apparatus according to one exemplary embodiment of the present invention.

The haptic panel and the display apparatus having the haptic panel according to one example embodiment are substantially the same as the haptic panel and the display apparatus explained referring to FIGS. 1 to 10B except for the layer structure of the display panel and the haptic panel. Thus, the same reference numerals will be used to refer to the same or like parts as those described with reference to FIGS. 1 to 10B, and the same explanations concerning the above elements will not be repeated.

Referring to FIGS. 1, 2, and 16, the display apparatus includes a display panel 100, a haptic panel 200, a timing controller 300, a display panel driver 400, and a haptic driver 500. The display panel driver 400 includes a gate driver 410, a gamma reference voltage generator 420, and a data driver 430.

The haptic panel 200 represents a tactile sense in response to a tactile signal and a thermal sense in response to a thermal signal. The haptic panel 200 includes a plurality of haptic units representing the tactile sense and the thermal sense thereon.

The display apparatus includes the display panel 100 and the haptic panel 200. In accordance with one exemplary embodiment, the haptic panel 200 is formed independently from the display panel 100, and the haptic panel 200 is attached to the display panel 100.

The display panel 100 is defined by a first substrate 110, a second substrate 120 facing the first substrate 110, and a liquid crystal layer LC disposed between the first and second substrates 110 and 120.

The haptic panel 200 is defined by a third substrate 210, a fourth substrate 220 facing the third substrate 210, a lower electrode LE, a P-type semiconductor PS, an N-type semiconductor NS, and an upper electrode UE. The lower electrode LE, the P-type semiconductor PS, the N-type semiconductor NS, and the upper electrode UE are disposed between the third and fourth substrates 210 and 220.

In accordance with one exemplary embodiment, the second substrate 120 may be in direct contact with the third substrate 210. The second substrate 120 may be attached to the third substrate 210.

The liquid crystal layer LC is disposed on the first substrate 110, and the second substrate 120 is disposed on the liquid crystal layer LC. For example, a thin film transistor array may be disposed between the first substrate 110 and the liquid crystal layer LC. A color filter layer may be disposed between the liquid crystal layer LC and the second substrate 120.

The third substrate 210 is disposed on the second substrate 120. The lower electrode LE is disposed on the third substrate 210. The P-type semiconductor and the N-type semiconductor are disposed on the lower electrode LE. The upper electrode UE is disposed on the P-type semiconductor PS and the N-type semiconductor NS.

The display apparatus may further include a radiating element to effectively release the heat generated to represent the thermal sense. For example, the lower surface of the third substrate 210 may include a convex/concave pattern for radiation.

According to one exemplary embodiment, the haptic panel 200 represents a tactile sense in response to a tactile signal and a thermal sense in response to a thermal signal. Thus, the touch determination, the tactile representation, and/or the thermal representation can be implemented on the single haptic panel 200, and thus the haptic function can be implemented more efficiently. In addition, the haptic panel 200 implements the haptic function by an electrical method, rather than mechanically, so that the compatibility between the haptic panel 200 and the display panel 100 can be improved.

Figure 17:
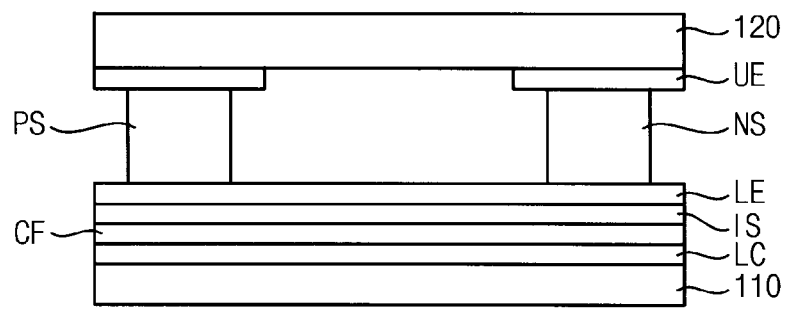
FIG. 17 is a cross-sectional view illustrating a display apparatus according to an exemplary embodiment of the present invention.

FIG. 17 is a cross-sectional view of a display apparatus according to one exemplary embodiment of the present disclosure.

The haptic panel and the display apparatus having the haptic panel of one example embodiment are substantially the same as the haptic panel and the display apparatus explained referring to FIGS. 1 to 10B except for the layer structure of the display panel and the haptic panel. Thus, the same reference numerals will be used to refer to the same or like parts as those described with reference to FIGS. 1 to 10B, and the same explanations concerning the above elements will not be repeated.

Referring to FIGS. 1, 2, and 17, the display apparatus includes a display panel 100, a haptic panel 200, a timing controller 300, a display panel driver 400, and a haptic driver 500. The display panel driver 400 includes a gate driver 410, a gamma reference voltage generator 420, and a data driver 430.

The haptic panel 200 represents a tactile sense in response to a tactile signal and a thermal sense in response to a thermal signal. The haptic panel 200 includes a plurality of haptic units for representing the tactile sense and the thermal sense.

The display apparatus includes the display panel 100 and the haptic panel 200. In accordance with one exemplary embodiment, the haptic panel 200 has an in-cell structure so that the haptic panel 200 may be integrally formed into the display panel 100.

The display panel 100 is defined by a first substrate 110, a second substrate 120 facing the first substrate 110, and a liquid crystal layer LC disposed between the first and second substrates 110 and 120.

The haptic panel 200 is defined by an insulating layer IS disposed on the liquid crystal layer LC, a lower electrode LE, a P-type semiconductor PS, an N-type semiconductor NS, and an upper electrode UE. The lower electrode LE, the P-type semiconductor PS, the N-type semiconductor NS, and the upper electrode UE are disposed between the insulating layer IS and the second substrate 120.

In accordance with one exemplary embodiment, the liquid crystal layer LC is disposed on the first substrate 110, and a color filter layer CF is disposed on the liquid crystal layer LC. The insulating layer IS may be disposed on the liquid crystal layer LC. For example, a thin film transistor array may be disposed between the first substrate 110 and the liquid crystal layer LC.

The lower electrode LE is disposed on the insulating layer IS. The P-type semiconductor and the N-type semiconductor are disposed on the lower electrode LE. The upper electrode UE is disposed on the P-type semiconductor PS and the N-type semiconductor NS.

According to one exemplary embodiment, the haptic panel 200 is operable to realize a tactile sense in response to a tactile signal and a thermal sense in response to a thermal signal. Thus, the touch determination, the tactile representation, and/or the thermal representation may be implemented on the single haptic panel 200, and thus the haptic function can be implemented more efficiently using a single haptic panel. In addition, the haptic panel 200 implements the haptic function using an electrical method, rather than mechanical, so that the compatibility between the haptic panel 200 and the display panel 100 can be improved.

In addition, the haptic panel 200 is integrally formed into the display panel 100 so that the thickness of the display apparatus may be reduced.

According to exemplary embodiments of the present invention as explained above, the display apparatus implements the touch determination, the tactile representation, and/or the thermal representation on the single haptic panel 200 so that the haptic function may be implemented more efficiently. In addition, the haptic panel 200 implements the haptic function in an electrical method, rather than mechanical, so that the compatibility between the haptic panel 200 and the display panel 100 can be improved.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A haptic panel comprising:
a plurality of haptic units,
wherein a haptic unit among the plurality of haptic units comprises a lower electrode, a P-type semiconductor and an N-type semiconductor disposed on the lower electrode, a first upper electrode disposed on the P-type semiconductor, and a second upper electrode disposed on the N-type semiconductor,
wherein the first upper electrode and the second upper electrode are spaced apart from each other, and
wherein the haptic unit is configured to represent a tactile sense in response to a tactile signal and a thermal sense in response to a thermal signal in different time periods.

2. The haptic panel of claim 1, wherein the lower electrode is overlapped with the P-type semiconductor, the N-type semiconductor, and the first and second upper electrodes.

3. The haptic panel of claim 1, wherein the haptic panel is configured to receive a touch voltage for representing a touch position where a touch is sensed, a tactile voltage generated based on the tactile signal, and a thermal voltage generated based on the thermal signal.

4. The haptic panel of claim 3, wherein only the haptic unit corresponding to the touch position is configured to represent the tactile sense and the thermal sense.

5. The haptic panel of claim 3, wherein the haptic unit is configured to represent the tactile sense by an electrostatic method.

6. The haptic panel of claim 5, wherein an upper electrode corresponding to the touch position is configured to receive a tactile voltage having a first polarity during a first period and configured to receive a tactile voltage having a second polarity during a second period.

7. The haptic panel of claim 3, wherein the haptic unit is configured to represent the tactile sense by an electrocutaneous method.

8. The haptic panel of claim 7, wherein an upper electrode corresponding to the touch position is configured to receive the tactile voltage and
wherein an upper electrode not corresponding to the touch position is configured to receive a ground voltage.

9. The haptic panel of claim 3, wherein an amplitude and a frequency of the tactile voltage are adjusted according to tactile senses to be created.

10. The haptic panel of claim 3, wherein the haptic unit is configured to represent the thermal sense by a Peltier method.

11. The haptic panel of claim 10, wherein an upper electrode corresponding to the touch position is configured to receive a thermal voltage having a first polarity, and an upper electrode sharing a lower electrode with the upper electrode corresponding to the touch position is configured to receive a thermal voltage having a second polarity, and
wherein an upper electrode not corresponding to the touch position is configured to receive a ground voltage.

12. The haptic panel of claim 10, wherein a polarity and a frequency of the thermal voltage are adjusted according to thermal senses to be created.

13. The haptic panel of claim 1, wherein the P-type semiconductor comprises at least one of Bismuth Telluride (Bi2Te3), Antimony Telluride (Bi2Sb3), Lead Telluride (Bi2Se3), Indium Selenide (In4Se3-x), Polyvinylidene fluoride (PVDF), PZT, carbon nanotube, graphene, and a metal wire, and
the N-type semiconductor comprises at least one of Bismuth Telluride (Bi2Te3), Antimony Telluride (Bi2Sb3), Lead Telluride (Bi2Se3), Indium Selenide (In4Se3-x), Polyvinylidene fluoride (PVDF), PZT, carbon nanotube, graphene, and a metal wire.

14. The haptic panel of claim 1, wherein the haptic unit comprises two lower electrodes comprising the lower electrode, two P-type semiconductor comprising the P-type semiconductor, two N-type semiconductor comprising the N-type semiconductor, and three upper electrodes comprising the first and second upper electrodes.

15. A display apparatus comprising:
a display panel configured to display an image;
a haptic panel overlapped with the display panel and comprising a plurality of haptic units, a haptic unit configured to represent a tactile sense in response to a tactile signal and a thermal sense in response to a thermal signal in different time periods,
wherein the haptic unit comprises a lower electrode, a P-type semiconductor and an N-type semiconductor disposed on the lower electrode, a first upper electrode disposed on the P-type semiconductor, and a second upper electrode disposed on the N-type semiconductor, and
wherein the first upper electrode and the second upper electrode are spaced apart from each other.

16. The display apparatus of claim 15, wherein the haptic panel is configured to receive a touch voltage, a tactile voltage generated based on the tactile signal, and a thermal voltage generated based on the thermal signal.

17. The display apparatus of claim 16, wherein the haptic panel is further configured to receive the touch voltage, the tactile voltage, and the thermal voltage in a vertical blank period provided between frames for the display panel.

18. The display apparatus of claim 15, wherein the display panel comprises a first substrate, a second substrate facing the first substrate, and a liquid crystal layer disposed between the first substrate and the second substrate,
the haptic panel comprises the second substrate, a third substrate facing the second substrate, the lower electrode, the P-type semiconductor, the N-type semiconductor, and the upper layer, and
the lower electrode, the P-type semiconductor, the N-type semiconductor, and the upper layer are disposed between the second substrate and the third substrate.

19. The display apparatus of claim 15, wherein the display panel comprises a first substrate, a second substrate facing the first substrate, and a liquid crystal layer disposed between the first substrate and the second substrate,
the haptic panel comprises a third substrate, a fourth substrate facing the third substrate, the lower electrode, the P-type semiconductor, the N-type semiconductor, and the upper layer, and
the lower electrode, the P-type semiconductor, the N-type semiconductor, and the upper layer are disposed between the third substrate and the fourth substrate.

20. The display apparatus of claim 15, wherein the display panel comprises a first substrate, a second substrate facing the first substrate, and a liquid crystal layer disposed between the first substrate and the second substrate,
the haptic panel comprises an insulating layer disposed on the liquid crystal layer, the lower electrode, the P-type semiconductor, the N-type semiconductor, and the upper layer, and the lower electrode, the P-type semiconductor, the N-type semiconductor, and the upper layer are disposed between the insulating layer and the second substrate.

* * * * *